April 26, 1960 T. B. CHACE 2,934,088

VALVES AND BODIES THEREFOR

Filed May 29, 1957

Inventor
Thomas B. Chace
by Hill, Sherman, Meroni, Gross & Simpson Attys

United States Patent Office 2,934,088
Patented Apr. 26, 1960

2,934,088

VALVES AND BODIES THEREFOR

Thomas B. Chace, Winnetka, Ill., assignor to The Dole Valve Company, Morton Grove, Ill., a corporation of Illinois Application May 29, 1957, Serial No. 662,364

1 Claim. (Cl. 137—605)

This invention relates to improvements in valves and bodies therefor, and more particularly relates to valves and bodies having provision for delivering a uniform rate of flow of fluid over a wide range of pressure variations.

A principal object of the invention is to provide an improved form of valve body and valve having a uniform rate of flow control device associated therewith, in which the chamber for the rate of flow control device is formed integrally with the valve body.

Another object of the invention is to provide a novel and improved form of valve body particularly adapted to be molded from a thermoplastic material having inlet and outlet passageways, in which a flow control chamber is molded in the valve body in association with one of said passageways, and in which a port is provided affording access to the flow control chamber from the outside of the valve body and accommodating the placing of a flow control device in the chamber.

A further object of the invention is to provide a more economical valve body for uniform delivery rate mixing valves and the like, by molding the valve body with a flow control chamber as an integral part thereof, and by providing a port in the body accommodating the insertion of a flow control device within the chamber, together with the provision of a separate sealing plug for sealing the port and flow control chamber.

Figure 1:
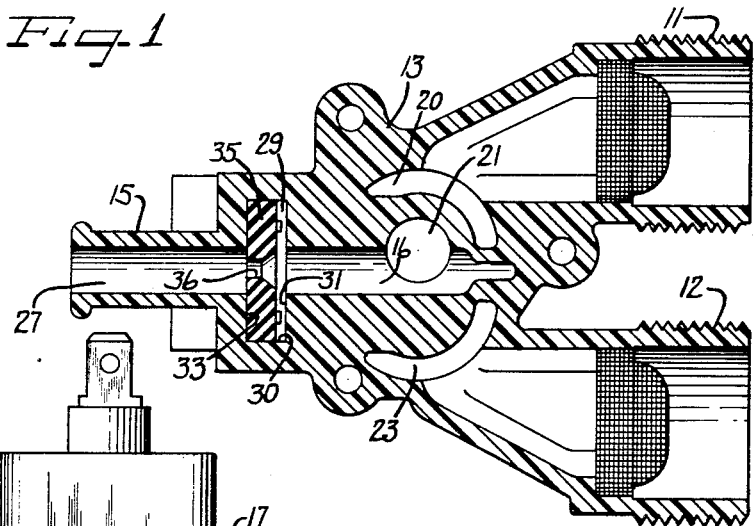
Figure 2:
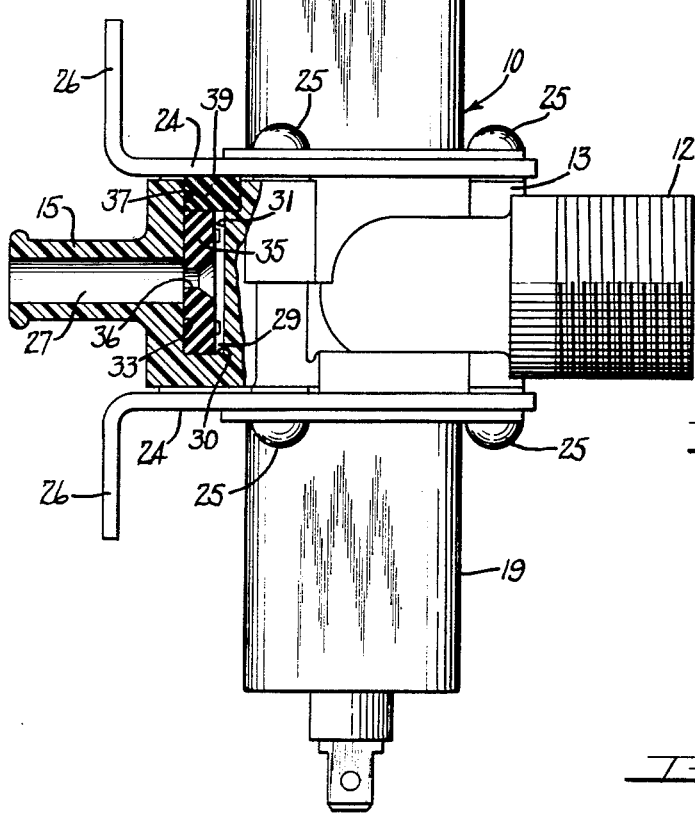

These and other objects of the invention will appear from time to time as the following specification proceeds and with reference to the accompanying drawing wherein:

Figure 1 is a horizontal sectional view taken through the body of a mixing valve, showing the inlets leading within the valve body and the outlet leading therefrom, with the integral flow control chamber in the outlet; and Figure 2 is a view in side elevation of the mixing valve, showing the outlet from the valve body and flow control chamber in section.

In the embodiment of the invention illustrated in the drawings, I have shown a valve 10, which may be a solenoid controlled mixing valve having hot and cold water inlets 11 and 12 respectively, leading into a body 13 for the valve and having an outlet 15 leading therefrom and formed integrally therewith.

The valve 10 is shown as being a solenoid controlled tempering valve, in which the mixing of hot and cold water in a central mixing chamber 16 of the valve is under the control of hot and cold water solenoids 17 and 19 respectively, as shown and described in Reissue Patent No. 24,255 which was reissued to James K. Lund on December 11, 1956, and no part of the present invention so not herein shown or described in detail.

As herein shown, the hot water inlet has communication with a vertically extending passageway 20 in the general form of a segment of a circle and opening to one side of the valve body, and having communication with a passageway 21 through a pressure operated diaphragm valve (not shown), under the control of the solenoid 17 as in the aforementioned Lund reissue patent.

The cold water inlet 12 has communication with a passageway 23 in the general form of the segment of a circle and opening to the opposite side of the valve body 13 from the passageway 20 and having communication with the mixing chamber or passageway 16 under control of a pressure operated diaphragm valve (not shown) controlled by the solenoid 19 as in the aforementioned Lund reissue patent.

The solenoids 17 and 19 are retained to the valve body in sealing engagement with opposite sides thereof by mounting brackets 24 extending about the solenoids 17 and 19 and secured thereto as by self-tapping screws 25. As herein shown, the mounting brackets 24 extend along the valve body toward the outlet 15 and have right angled portions 26 for mounting the valve to the cabinet of a washing machine and the like.

The valve body 13 may be molded from a suitable thermoplastic material which will withstand the heat of the hot water flowing therethrough, one such suitable material being a nylon thermoplastic material, and the entire valve body is of a molded construction, molded under pressure with the various passageways formed by coring. It should be understood, however, that the valve body need not necessarily be molded from a nylon thermoplastic material, but may be molded from other thermoplastic materials or from brass or any other suitable material desired.

As shown in Figure 1, the mixing chamber or passageway 16 is in axial alignment with an outlet passageway 27 extending along the outlet 15, which is molded as an integral part of the valve body. Between the mixing passageway 16 and outlet passageway 27 is an enlarged diameter flow control chamber 29, formed by coring in the molding operation of the valve body, and having a generally cylindrical wall 30, an upstream annular face 31 concentric with the mixing passageway 16, and a downstream annular face 33 concentric with the passageway 27 and forming a seat for a resilient flow control device 35, herein shown as being annular in form and having a central deformable orifice 36 leading therethrough. A port 37 is formed in the valve body and affords an access opening in communication with the flow control chamber 29, to accommodate the flow control device 35 is be inserted therein. As herein shown, the port 37 opens to a mounting bracket 24 and is sealed by a resilient plug 39, which may be made from rubber, an elastomer or a like material. The plug 24 is shown as being retained in sealing engagement with the port 37 by the mounting bracket 24 projecting thereover.

The flow control device 35 may be made from a resilient material, such as rubber, or one of the well known substitutes for rubber such as an elastomer or the like and may be of various well known forms. The flow control device herein shown is annular in form and controls the flow of water through the outlet passageway to maintain a uniform delivery rate of water through said outlet passageway over a wide range of variations in pressure at the source by flexing in a downstream direction as the pressure on the flow control device increases and thereby reducing the cross-sectional area of the orifice 36 upon increases in pressure on the flow control device. The flow control device herein shown operates on the same general principles as disclosed in Patent No. 2,389,134 which issued to Clyde A. Brown on November 20, 1945, although the flow control device may be of various other forms well known to those skilled in the art.

It may be seen from the foregoing that an improved form of valve body has been provided in which the outlet from the valve body is molded as an integral part thereof, and in which a flow control chamber is molded in the valve body between the mixing passageway 16 and outlet passageway 27 as an integral part of the valve body.

It may further be seen that access to the flow control chamber is attained through the port 37 and that the flow control 35 may be inserted in the flow control chamber through said port, with its flat downstream face in cooperative association with the annular seat 33 of the flow control chamber, and that the port is sealed by the resilient seal 39, maintained in sealing engagement therewith by a mounting bracket 24 for the valve.

While I have herein shown and described one form in which my invention may be embodied, it will be understood that various modifications and variations thereof may be effected without departing from the spirit and scope of the novel concepts thereof.

I claim as my invention:

In a uniform rate of flow mixing valve, a molded thermoplastic valve body having integrally formed hot and cold water inlets leading thereinto, a mixing chamber within said valve body and an outlet formed integrally with said valve body and leading from said mixing chamber, a flow control chamber molded in said valve body between said mixing chamber and said outlet and in direct communication with said outlet and having an annular flow control seat encircling the upstream end of said outlet and concentric therewith, a resilient flow control device seated on said seat and having flow cooperation therewith, a port molded in said valve body and leading from the outside of said valve body to said flow control chamber and affording access to said flow control chamber and accommodating the insertion of said resilient flow control device within said flow control chamber, a resilient plug closing and sealing said port, and a mounting bracket secured to said valve body and extending over said plug and maintaining said plug in sealing engagement with said port.

References Cited in the file of this patent
UNITED STATES PATENTS

| Re. 24,255 | Lund | Dec. 11, 1956 |
| 2,301,781 | Higbee | Nov. 10, 1942 |